H. RIESEL,
Assignor of one-half to S. B. STEERS.
AUTOMATIC BALE ROLLING ATTACHMENT FOR COMPRESSORS.
No. 9,898. Reissued Oct. 18, 1881.
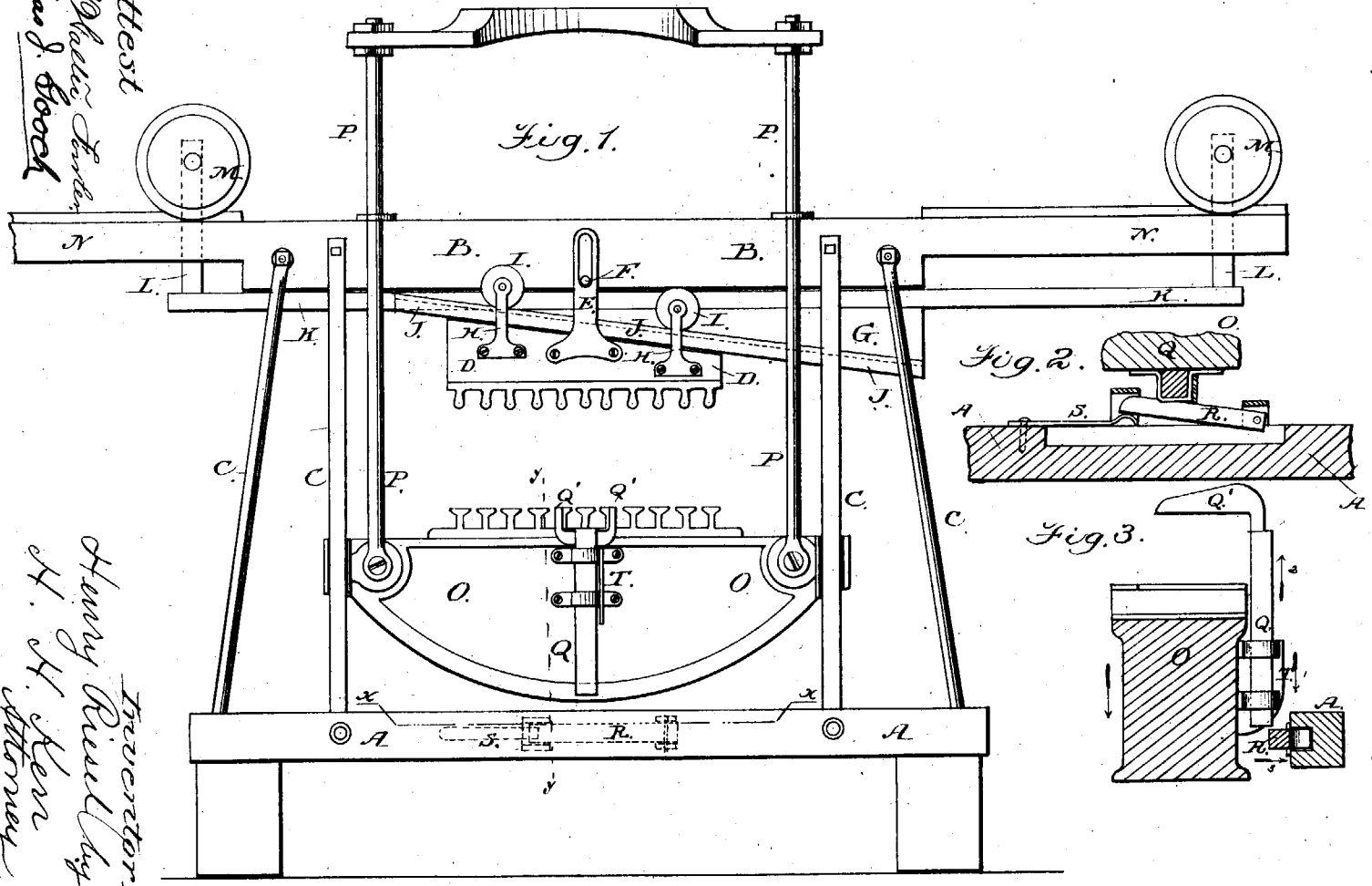
Attest
J. Walter Foster
Chas J. Gooch
Inventor:
Henry Riesel by
H. H. Kerr
Attorney
N. PETERS, Photo-Lithographer, Washington, D. C.

UNITED STATES PATENT OFFICE.

HENRY RIESEL, OF GALVESTON, TEXAS, ASSIGNOR OF ONE-HALF TO SCHUYLER B. STEERS, OF NEW ORLEANS, LOUISIANA.

AUTOMATIC BALE-ROLLING ATTACHMENT FOR COMPRESSORS.

SPECIFICATION forming part of Reissued Letters Patent No. 9,898, dated October 18, 1881.

Original No. 167,939, dated September 21, 1875. Application for reissue filed September 1, 1881.

*To all whom it may concern:*

Be it known that I, HENRY RIESEL, of Galveston, in the county of Galveston, State of Texas, have invented certain new and useful Improvements in Cotton-Compresses, of which the following is a specification.

The objects of my improvements are, first, to keep the upper platen in place directly over the lower platen or follower, while the wedge to which the upper platen is attached is run in or out for the purpose of raising or lowering said platen, and thereby increasing or diminishing the distance between the two platens, according to the thickness of the bale to be compressed; and, second, to furnish an improved device for rolling the bale when compressed and tied from the press to the floor. I attain these objects by mechanism illustrated in the accompanying drawings, in which—

Figure 1 is a rear view of a compress to which my improvements have been applied, shown in position for compressing a bale. Fig. 2 is a detail horizontal section, taken through the line *x x*, Fig. 1; and Fig. 3 is a detail vertical section, taken through the line *y y*, Fig. 1.

A is the base of the press, and B is the housing or beam, which is connected to the base A by the posts and rods C.

D is the upper platen or head block, the face of which is transversely grooved to admit the passage of the bale-ties, and to its side edges are attached arms E, the upper parts of which are slotted longitudinally to receive pins F, attached to the side edges of the beam B, to cause the platen D to move up and down vertically when being adjusted. The upper side of the platen D is inclined to fit against the inclined lower side of the wedge G, and to its side edges are attached arms H, to the upper ends of which are pivoted wheels I, which roll along ways J, attached to the wedge G.

To the upper part of the side edges of the wedge G are attached bars K, to the projecting ends of which are attached the lower ends of the upright arms L.

To the upper ends of the arms L are pivoted wheels M, which roll along bars or ways N, projecting from the ends of the beam B, so that the wedge G can be readily removed to adjust the head-block D to the thickness of the bale to be compressed. The wedge G may be built up of thin timbers laid with the grain of the wood crossing each other, to prevent said wedge from being crushed by the pressure, or the wedge and bars K may be cast in one piece of iron.

O is the lower platen or follower, which is made very heavy, and to the end parts of the side edges of which are attached the lower ends of the rods P, the upper ends of which are connected with the engine by which the pressure is applied. The platen O, when lowered to receive the bale, passes down through an opening in the base A.

Q is an upright bar, which passes through and works in keepers attached to the side of the platen O. Upon the upper end of this bar are formed two or more prongs or arms, Q′, which project forward at right angles, and are so arranged as when lowered to pass into grooves of the platen O.

R is a latch, one end of which is pivoted in a groove in the inner side of the side beam of the base A, and its free end is held out by the spring S, also attached to said side beam.

T is a bar attached to the side of the platen O, at or near the pronged bar Q. The lower end of the bar T is beveled or rounded off, so as to push the latch R back into its groove as the follower O descends. By this construction, when the platen O is down in the position to receive the bale, the prongs or arms Q′ of the bar Q rest in the grooves or channel-ways of said platen, the prongs or arms Q′ working in the grooves or channel-ways and forming, when at rest, two of the channel-bars or ridges, and the bale, when placed upon the platen, rests upon them. After the platen has been raised, the bale compressed, and its ties secured, it is again lowered. As the platen descends the lower end of the bar Q strikes against the latch R, which stops said bar Q and causes the prongs Q′ of said bar to rise against the rear part of the lower side of the bale and roll or tumble it off the platen, so that it can be readily removed by the attendants. As the platen continues to descend the inclined bar T strikes the latch R and pushes it from beneath the bar Q, allowing the said bar to drop into place, and the compress is ready to receive another bale.

What I claim is—

1. The combination, with the platen D, vertically-slotted arms E, and arms H, having wheels I, of the beam B, having pin F, wedge G, and ways J.

2. The combination, with the beam B, having ways N, of the wedge G, having arms K, uprights L, and the wheels M, substantially as and for the purpose described.

3. The bale-ejecting bar Q, provided with arms or prongs Q′, as described, constituting when at rest two of the channel-bars, substantially as described.

4. The bale-ejecting bar Q, provided with arms or prongs Q′, adapted to work within the grooves or channel-ways, for the purpose described.

5. The bar Q, provided with two or more forwardly-projecting prongs, Q′, upon its upper end, the spring-latch R S, the inclined bar T, in combination with the platen O and base A, substantially as herein shown and described.

6. The manner herein described of attaching the upper platen to the wedge by means of the arms H, wheels I, and ways J.

HENRY RIESEL.

Witnesses:
H. C. LINKE,
R. L. FULTON.